United States Patent [19]

Yoshida

[11] 4,339,806
[45] Jul. 13, 1982

[54] ELECTRONIC DICTIONARY AND LANGUAGE INTERPRETER WITH FACULTIES OF EXAMINING A FULL-LENGTH WORD BASED ON A PARTIAL WORD ENTERED AND OF DISPLAYING THE TOTAL WORD AND A TRANSLATION CORRESPONDING THERETO

[76] Inventor: Kunio Yoshida, 2541-10, Hari, Tsugemura, Yamabe-gun, Nara-ken, Japan

[21] Appl. No.: 94,569

[22] Filed: Nov. 15, 1979

[30] Foreign Application Priority Data

Nov. 20, 1978 [JP] Japan ............... 53-160221[U]

[51] Int. Cl.³ ............................................. G06F 15/38
[52] U.S. Cl. ................................................... 364/900
[58] Field of Search ... 364/900 MS File, 200 MS File, 364/419; 35/35 R

[56] References Cited

U.S. PATENT DOCUMENTS 4,130,882 12/1978 Swanstrom et al. ............ 364/900

4,158,236 6/1979 Levy ............................... 364/900

FOREIGN PATENT DOCUMENTS 1448211 9/1976 United Kingdom ............ 364/900

Primary Examiner—Raulfe B. Zache

[57] ABSTRACT

A portable word information storage apparatus comprises an input device for entering a partial word in a specific language, the partial word containing at least one character and at least one blank character, a memory device for storing a plurality of full-length words in the same specific language and a plurality of translations corresponding thereto, an addressing device for addressing the memory device, a coincidence device for determining the partial coincidence between the partial word and the full-length word, and a driving device for driving two displays, whereby a pair of one full-length word and one translation thereof are respectively displayed in the two displays. The partial word may contain two or more blank characters wherein a couple of one total word and one translation thereof are successively examined and determined, and then displayed.

9 Claims, 1 Drawing Figure

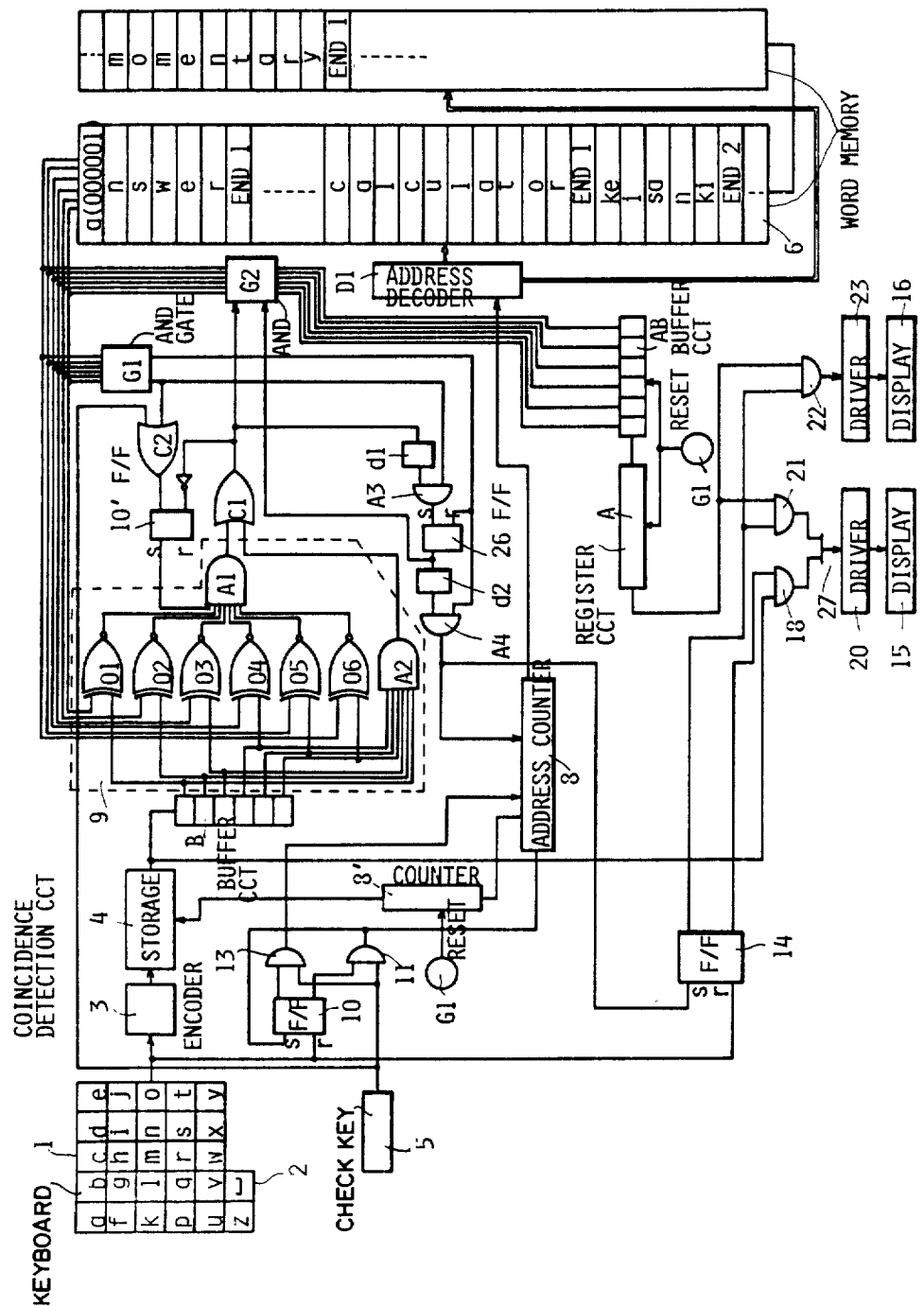

ELECTRONIC DICTIONARY AND LANGUAGE INTERPRETER WITH FACULTIES OF EXAMINING A FULL-LENGTH WORD BASED ON A PARTIAL WORD ENTERED AND OF DISPLAYING THE TOTAL WORD AND A TRANSLATION CORRESPONDING THERETO

BACKGROUND OF THE INVENTION

The present invention relates to a portable word information storage apparatus and, more particularly, to an electronic dictionary and language interpreter with faculties of examining and simultaneously displaying a complete word and a translated word corresponding thereto, the complete word being determined with the entry of a partial word which the user is sure of.

An example of a recent electronic dictionary and language interpreter was disclosed in Levy U.S. Pat. No. 4,158,236 issued June 12, 1979, entitele "ELECTRONIC DICTIONARY AND LANGUAGE INTERPRETER". In this patent, a means was disclosed which searched all words stored in an ROM and displayed words having letters which matched the letters entered by the user were displayed. The letters entered were part of a complete word which was designated by all of its letters the user entered or in the alternative a partial word representing letters he entered and was sure of and a blank character entered for each letter he was not sure of.

The complete word or the partial word were displayed and all other words which matched the entered letters were then examined. In connection with the entry of the partial word, however, it was be further desirous that the translation corresponding to a complete specific word relevant to the partial word entered be searched for or examined and then displayed together with the complete specific word.

SUMMARY OF THE INVENTION

Accordingly, it is an object of the present invention to provide an improved portable word information system with faculties of examining and simultaneously displaying a full-length or complete word and a translated word corresponding thereto, the complete word being obtained and determined from a partial word entered with an input keyboard. It is another object of the present invention to provide an improved electronic dictionary and language interpreter comprising means for determining and simultaneously displaying a full-length or complete word and a translated word corresponding thereto on the basis of a partial word entered with an input keyboard.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To acheive the above objects, pursuant to an embodiment of the present invention, a portable word information storage apparatus comprises an input device for entering a partial word in a specific language, the partial word containing at least one character and at least one blank character, a memory device for storing a plurality of full-length words in the same specific language and a plurality of translations corresponding thereto, an addressing device for addressing the memory device, a coincidence device for determining the partial coincidence between the partial word and the full-length word, and a driving device for driving two displays, whereby a pair of one full-length word and one translation thereof are respectively displayed in the two displays. The partial word may contain two or more blank characters wherein a couple including one full-length word and one translation thereof are successively examined and determined, and then displayed.

BRIEF DESCRIPTION OF THE DRAWINGS

The present invention will become more fully understood from the detailed description given hereinbelow and accompanying drawing which are given by way of illustration only, and thus are not limitative of the present invention and wherein:

The single FIGURE of the drawings is a block diagram of a circuit of an electronic dictionary and language interpreter according to the present invention.

DESCRIPTION OF THE INVENTION

First of all, any kind of languages can be applied to an electronic dictionary and language interpreter of the present invention. A partial word of a specific language is entered to obtain a full-length word in that language and besides, a translation of a different language of the full-length word. The specific langauge and the different language are freely selected by the user.

According to an example of the present invention, it is assumed that the specific language is English and the different language is Japanese.

Referring to the single FIGURE, there are provided an alphabetical keyboard 1, a blank character key 2, an encoder circuit 3, an input code storage circuit 4, a check key 5, a word memory 6, an address counter 8, a counter 8', a coincidence detection circuit 9, flip flop circuits 10, 10', 14, and 26, a plurality of AND gates 11, 13, A1 to A4, G1, G2, 18, 21, and 22, a register circuit A, a buffer circuit B and AB, an address decoder D1, two driver circuits 20 and 23, two displays 15 and 16, a plurality of exclusive OR gates O1 to O6, two delay circuits d1 and d2, and OR gates C1, C2 and 27.

It is not assumed that in a word "calculator" of English, the user is sure of the characters "c", "a", "l", "c", "u", "l", "a", "t", and "r" and is not sure of the character "O". All the characters which he is sure of are in sequence introduced by actuation the alphabetical keyboard 1. At the letter position related to the unknown character "O", the blank character key 2 is actuated to enter unknown symbol information "⊔". Therefore, a partial word represented by "calculat⊔r" is applied to the circuit shown in the single FIGURE.

Under the circumstances, a full-length English word "calculator" is examined and determined on the basis of the partial word "calculat⊔r" and, in addition, a Japanese translation "Ke-i-sa-n-ki" corresponding to the full-length English word is also examined and searched. The full-length English word "calculator" and the Japanese translation "ke-i-sa-n-ki" are both displayed as mentioned hereinafter.

A feature of the present invention is that the contents stored in the word memory 6 are entered into the plurality of exclusive OR gates O1 to O6 included within the coincidence detection circuit 9 in the form of a unit of a character determined from the leading address, under he control of the address counter 8 and the address decoder D1.

Coincidence is determined by the coincidence detection circuit 9 between the character information entered with the keyboard actuation and the letter information stored in the word memory 6 so that a full-length word and a translation corresponding thereto are both obtained and displayed.

The details of the above stated feature are now described. The partial word information "calculat⊔r" is applied to and stored in the input code storage circuit 4 through the encoder circuit 3. At that time, the two flip flop circuits 10 and 14 are placed in a reset condition by the keyboard actuation. Under the circumstances, the check key 5 is actuated to indicate the termination of the input word information entry so that the AND gate 1 is made conductive since the RS flip flop circuit 10 is placed in the reset condition. The address counter 8 is reset so that it addresses the leading address of the word memory 6 with the help of the address decoder D1. Simultaneously, the flip flop circuit 10 is turned to be set in response to output signals developed from the AND gate 11 so that count up information is generated from the AND gate 13 to the address counter 8.

Therefore, the contents of the address counter 8 are subsequently counted up so that according to them, the contents of the word memory 6 are also in turn applied to the coincidence detection circuit 9 with the help of the address decoder D1. The coincidence detection circuit 9 comprises the plurality of exclusive OR gates O1 to O6 and two AND gates A1 and A2. The coincidence detection circuit 9 acts to determine the coincidence in the form of character information representative of only one character between the partial character information entered with the alphabetical keyboard 1 and complete word information stored in the word memroy 6.

At first, the first character information derived from the alphabetical keyboard 1 representing the character "c" is loaded to the buffer circuit B and then applied to the coincidence detection circuit 9.

Since the first letter information stored in the word memory 6 is assumed to represent the character "a" and is applied to the coincidence detection circuit 9, the coincidence is not accomplished between the first character information entered by means of the alphabetical keyboard 1 and the first letter information stored in the word memory 6. Accordingly, the flip flop circuit 10' is turned reset since it is placed in a set condition immediately after the check key 5 is actuated.

The plurality of exclusive OR gates O1 to O6 admit information representing only one character. The information contains a code which information indicative of forms a specific character. When respective parts of the code applied to the exclusive OR gates O1 to O6; are coincident with the code information derived from memory, it means that the two specific characters coincides as well.

The AND gate A1 is not conductive when the flip flop circuit 10' is placed in a reset condition. Output signals from the AND gate A1 are thus not developed and not applied to the OR gate C1, whereby the AND gate G2 is not made conductive. Therefore, the letter information developed from the word memory 6 is prevented from being transferred to the buffer circuit AB and the register circuit A through the AND gate G2. The AND gate G2 is provided for transferring the letter information stored in the word memory 6 to the buffer circuit AB and the register circuit A. Under the circumstances, while the address counter 8 is subsequently counts up, the AND gate A1 is left non-conductive because of the reset condition of the flip-flop circuit 10' under the condition where the coincidence is not established between the character information from the alphabetical keyboard 1 and the letter information from the word memory 6.

Then END 1 code information stored in the word memory 6 is addressed and developed immediately after a series of letter information "a", "n", "s", "w", "e", and "r". The AND gate G1 is provided to detect the generation of the END code information. In response to the generation of the END 1 code information, the AND gate G1 is made conductive so that output signals are developed from the AND gate G1 and applied to the flip flop circuit 10' through the OR gate C2.

Output signals to be developed from the AND gate G1 through its left-hand line connected the OR gate C2 are concerned with the END 1 code information designating the termination of the English letter information held in the word memory 6. Output signals to be developed from the AND gate G1 through its right-hand line coupled to the flip flop circuit 26 are generated in connection with the END 2 code information representing the termination of the Japanese letter information stored in the word memory 6.

Only when the END 1 code information is detected by the AND gate G1 and, in addition, the coincidence is obtained between the character information from the alphabetical keyboard 1 and the word information from the letter memory 6, in which case the AND gate A1 becomes conductive to develop output signals, is a microorder reset G1 developed which is applied to the counter 8', the buffer circuit AB, and the register circuit A to make them reset.

Therefore, the address counter 8 is subsequently counted up to examine the following letter information until the coincidence is obtained between the character information entered by the alphabetical keyboard 1 and the letter information stored in the word memory 6. Now it is assumed that the coincidence is accomplished therebetween as stated below.

At first, the letter information representative of "c" is transferred to the coincidence detection circuit 9 at a certain condition of the address counter 8. As the character information designating "c" is also supplied to the same circuit 9, all the exclusive OR gates O1 to O6 are conductive so that the AND gate A1 become conductive to generate output signals.

Simultaneously with the occurrence of the coincidence, the letter information representing "c" is introduced into the buffer circuit AB and then the register circuit A.

Similarly, a certain number of the following letter information each representing "a", "l", "c", "u", "l", "a", and "t" are in turn entered into the buffer circuit AB and then the register circuit A.

The blank character code information entered by the blank character key 2 is then entered into the buffer circuit B and the AND gate A2.

It is assumed that the AND gate A2 becomes conductive in response to the entry of the blank character code information. Output signals from the AND gate A2 are applied to the OR gate C1 so that the OR gate C1 is conductive to permit the AND gate G2 to transfer the letter information from the word memory 6 representing the character "O" to the buffer circuit AB and the register circuit A. Although the coincidence is not obtained in the exclusive OR gates O1 to O6, the OR gate C1 is turned conductive. Similarly, as mentioned above, the letter information representative of "r" developed from the word memory 6 is further entered to the buffer circuit AB and the register circuit A. At the next condition of the address counter 8, the END 1 code information developed from the word memroy 6 is detected by the AND gate G1. Output signals are developed by the AND gate G1 through its left-hand line connected to the AND gate A3, being generated in connection with the END 1 code information. At the same time, the output signals from the OR gate C1 designating the coincidence about the preceding character "r" are entered to the delay circuit d1. The AND gate A3 admitts the output signals from the AND gate G1 and from the delay circuit d1 so that the flip flop circuit 26 becomes set.

The set output signals from the flip flop circuit 26 are applied to the AND gate G2 so that the AND gate G2 is permitted to transfer a series of the letter information designating a Japanese translation corresponding to the English full-length word information to the buffer circuit AB and then the register circuit A under the control by the address counter 8 and the address decoder D1. The Japanese translation is stored in the word memory 6 in the form of the letter code information so that the Japanese translation is addressed immediately after the English full-length word infomration is wholly addressed.

Therefore, the Japanese translation "ke-i-sa-n-ki" corresponding to the English full-length word information "calculator" is transmitted to the buffer circuit AB and then the register circuit A. Regardless of the output signals from the OR gate C1 controlled by means of the coincidence detection circuit 9, the AND gate G2 is activated to transport the Japanese translation from the word memory 6 to the buffer circuit AB and then to the register circuit A.

The set output signals from the flip flop circuit 26 are entered into the delay circuit d2. The output signals from the delay circuit d2 are admitted to the AND gate A4. When the END 2 code information for the Japanese translation is determined by the AND gate G1 and the output signals are developed from the AND gate G1 through its right-hand line connected to the AND Gate A4, the AND gate A4 receives the output signals from the delay circuit d2 and from the AND gate G1.

The counting operations caused in the address counter 8 are terminated in response to output signals from the AND gate A4. Similtaneously, the output signals from the AND gate A4 are applied to the flip flop circuit 14 so that flip flop circuit 14 is set.

The set output signals from the flip flop circuit 14 are employed to substantially simultaneously transfer the character information stored in the buffer circuit AB and the register circuit A into the AND gates 21 and 22. The AND gate 18 is provided for conducting the character information from the alphabetical keyboard 1 and the blank character key 2. The OR gate 27 is connected to the two AND gates 18 and 21 so as to conduct the English full-length word information.

The two driver circuits 20 and 23 are provided to substantially simultaneously drive the two displays 15 and 16, respectively. The alphabetical display 15 indicates the English complete word information defined by the English partial word as mentioned above. At the substantially same time, the display 16 shows the Japanese translation corresponding to the English full-length word information. The display 16 may be an alphabetical display or Japanese kana character display.

If the entered partial word contains two or more blank character code information, elements e.g., "moment⎵⎵⎵⎵", all the full-length words partially defined with the help of the partial word may be sequentially obtained together with their respective Japanese translations. In such a case, the address counter 8 may be prevented from being inoperative even after first complete word information and its Japanese translation information are both obtained and stored in the register circuit A in the same manner as mentioned above. In addition, while the flip flop circuit 14 is being placed in the set condition, the address counter 8 may be operated for a certain time of period to continue to address the letter information stored in the word memory 6.

Therefore, the following English full-length words may continually be obtained together with respective Japanese translations.

"moment"
"momentary"
"momentarily"
"momentous" and
"momentum"

The English full-length words and their Japanese translations may be in sequence displayed in the alphabetical display 15 and the display 16.

When the entered English partial word contains only one character such as "k" entered by the alphabetical keyboard 1 and a number parts of blank character code information entered by the blank character key 2, it may be possible that a plurality of English full-length word beginning at the initial character "k" are examined and obtained together with their Japanese translations.

While only certain embodiments of the present invention have been described, it will be apparent to those skilled in the art that various changes and modifications may be made therein without departing from the spirit and scope of the invention as claimed.

What is claimed is:

1. A portable word information storage apparatus comprising:
   means for entering a partial word in a specific language, the partial word containing at least one character and at least one blank character;
   first means for storing a plurality of full-length words in the same specific language;
   first means for addressing the storing means so as to search the plurality of full-length words;
   means responsive to the entering means and the storing means for determining a coincidence between the partial word entered by said entering means and corresponding letters of each of the plurality of full-length words stored in the storing means, said means for determining producing a coincidence signal upon detection of each said coincidence;
   second means for storing a plurality of translations corresponding to the plurality of full-length words stored in the first storing means;
   first means responsive to the coincidence signals produced by said determining means for indicating the coincident full-length word on a first display;
   second means responsive to the determining means for addressing the second storing means so as to recall each of the plurality of translations corresponding to a coincident full-length word; and second means responsive to the second addressing means for indicating the translation corresponding to the coincident full-length word in a second display.

2. The apparatus as set forth in claim 1, wherein the first storing means and the second storing means are digital memory means.

3. The apparatus as set forth in claim 1, wherein the determining means further comprises;
   a plurality of exclusive OR gate means, each for receiving one character from the entering means and one character from the full-length words of the first storing means; and,
   means responsive to said at least one blank character applied by the entering means for passing an associated character of said first storage means to said first means for indicating upon the generation of a coincidence signal.

4. The apparatus as set forth in claim 3, which further comprises means responsive to the coincidence signals from the determining means for transferring the coincident full-length word to the first indicating means.

5. The apparatus as set forth in claim 4, wherein the transferring means further conducts the translation corresponding to the coincident full-length word to the second indicating means.

6. The apparatus as set forth in claim 5, which further comprises a means responsive to the coincidence signals from the determining means for controlling the second addressing means so as to develop and transfer the one of the plurality of translations corresponding to each full-length word to the second indicating means.

7. The apparatus as set forth claim 6, wherein the controlling means comprises:
   first means for detecting the termination of the transfer of each of the coincident full-length words from the first storing means;
   means responsive to the coincidence signals from the determining means for maintaining each of said coincidence signals for a certain time period;
   means responsive to the first detecting means and the maintaining means for providing translation control signals, and
   means responsive to the translation control signals from the providing means for enabling the transfer of the translation corresponding to the incident total word into the second indicating means.

8. The apparatus as set forth in claim 7, which further comprises:
   second means for detecting the termination of the transfer of the one translation of the second indicating means;
   means responsive to the second detecting means and the providing means for making the first and the second addressing means inoperable, where further information is prevented from being developed from the first and the second storing means, respectively, and
   means responsive to the making means for permitting the first and the second indicating means to operate so as to indicate only one total word and the one translation corresponding thereto on the first and the second displays, respectively, at any one time.

9. The apparatus as set forth in claims 2, 3, 4, 5, 6, 7 or 8, wherein two or more blank characters may be included in said partial word.

* * * * *

UNITED STATES PATENT AND TRADEMARK OFFICE
CERTIFICATE OF CORRECTION

PATENT NO. : 4,339,806
DATED : July 13, 1982
INVENTOR(S) : Yoshida

It is certified that error appears in the above—identified patent and that said Letters Patent is hereby corrected as shown below:

After the category "[76] Inventor" insert the following:

--[73] Assignee: Sharp Kabushiki Kaisha, Osaka, Japan--

After "Primary Examiner--Raulfe B. Zache" insert the following:

--Attorney, Agent, or Firm--Birch, Stewart, Kolasch and Birch--

Signed and Sealed this

Twenty-first Day of December 1982

[SEAL]

Attest:

Attesting Officer

GERALD J. MOSSINGHOFF
Commissioner of Patents and Trademarks